US012601684B2

(12) United States Patent
Denkova et al.

(10) Patent No.: US 12,601,684 B2
(45) Date of Patent: Apr. 14, 2026

(54) DEVICE FOR MEASURING INTRINSIC AUTOFLUORESCENCE OF A BIOLOGICAL SAMPLE AND METHOD USING THEREOF

(71) Applicants: FUNDACIO INSTITUT DE BIOENGINYERIA DE CATALUNYA, Barcelona (ES); SCRANTON ENTERPRISES B.V., Amsterdam (NL)

(72) Inventors: Denitza Nikolaeva Denkova, Barcelona (ES); Albert Parra Martínez, Barcelona (ES); Anna Seriola Petit, Barcelona (ES); Samuel Ojosnegros Martos, Barcelona (ES)

(73) Assignees: FUNDACIO INSTITUT DE BIOENGINYERIA DE CATALUNYA, Barcelona (ES); SCRANTON ENTERPRISES, Amsterdam (NL)

( * ) Notice: Subject to any disclaimer, the term of this patent is extended or adjusted under 35 U.S.C. 154(b) by 79 days.

(21) Appl. No.: 18/839,241

(22) PCT Filed: Feb. 23, 2023

(86) PCT No.: PCT/EP2023/054610
§ 371 (c)(1),
(2) Date: Aug. 16, 2024

(87) PCT Pub. No.: WO2023/161375
PCT Pub. Date: Aug. 31, 2023

(65) Prior Publication Data
US 2025/0180483 A1 Jun. 5, 2025

(30) Foreign Application Priority Data
Feb. 24, 2022 (EP) ..................................... 22382161

(51) Int. Cl.
*G01N 21/64* (2006.01)
*G02B 21/00* (2006.01)
(Continued)

(52) U.S. Cl.
CPC ..... *G01N 21/6486* (2013.01); *G01N 21/6458* (2013.01); *G02B 21/0076* (2013.01);
(Continued)

(58) Field of Classification Search
CPC .......... G01N 21/6486; G01N 21/6458; G01N 2201/0238; G01N 2201/06113;
(Continued)

(56) References Cited

U.S. PATENT DOCUMENTS 8,179,597 B2 * 5/2012 Namba .............. G01N 21/6452
359/383
10,429,629 B1 * 10/2019 Brundage .............. G02B 21/32
(Continued)

OTHER PUBLICATIONS

Adams et al., "Light Sheet Fluorescence Microscopy (LSFM)", Current Protocols in Cytometry, Jan. 2015, in 15 pages.
(Continued)

*Primary Examiner* — Abdullahi Nur
(74) *Attorney, Agent, or Firm* — Knobbe, Martens, Olson & Bear, LLP

(57) ABSTRACT

A device for measuring intrinsic autofluorescence of molecules present in a biological sample wherein the device includes: a) a light-sheet, virtual light-sheet or light line delivery pathway module including a laser generator capable of generating ultrashort pulses with a duration between 1 microsecond and 1 attosecond, and optical elements shaping the laser light into a light sheet, virtual light-sheet or light-line; b) an imaging chamber including an imaging dish inside of which the biological sample is placed, a translational stage, an illumination objective and a collection (Continued)

objective both immersed in an immersion liquid in a sealed immersion chamber, wherein both objectives are positioned below the imaging dish, wherein the immersion chamber is placed inside an incubation chamber, allowing environmental control; and c) a fluorescence detection pathway including optical elements, light-splitting elements such as diffractive elements or dichroic mirrors, an array detector, and a device control and signal processing unit.

31 Claims, 4 Drawing Sheets

(51) Int. Cl.
G02B 21/26 (2006.01)
G02B 21/36 (2006.01)

(52) U.S. Cl.
CPC ........... G02B 21/26 (2013.01); G02B 21/367 (2013.01); *G01N 2201/0238* (2013.01); *G01N 2201/06113* (2013.01)

(58) Field of Classification Search
CPC .. G02B 21/0076; G02B 21/26; G02B 21/367; G02B 21/33; G02B 21/002; G02B 21/16; G02B 26/101
See application file for complete search history.

(56) References Cited

U.S. PATENT DOCUMENTS

| | | | | |
|---|---|---|---|---|
| 2008/0252967 | A1* | 10/2008 | Tomioka | G02B 21/33 |
| | | | | 359/398 |
| 2009/0273774 | A1* | 11/2009 | Sieracki | G01N 15/1433 |
| | | | | 356/73 |
| 2018/0052314 | A1* | 2/2018 | Brinkman | G02B 21/22 |
| 2019/0120753 | A1* | 4/2019 | Prater | G01N 21/59 |
| 2020/0012084 | A1* | 1/2020 | Siebenmorgen | G02B 21/06 |
| 2020/0073103 | A1* | 3/2020 | Wang | G01N 21/1702 |
| 2020/0309700 | A1* | 10/2020 | Gandhi | G01N 21/6458 |

OTHER PUBLICATIONS

De Vito et al., "Fast whole-brain imaging of seizures in zebrafish larvae by two-photon light-sheet microscopy", Arxiv.org, 2020, in 35 pages.
Glaser et al., "Multi-immersion open-top light-sheet microscopy", Progress in Biomedical Optics and Imaging—SPIE, 2020, vol. 11245, in 4 pages.
International Search Report and Written Opinion issued in International Application No. PCT/EP2023/054610, mailed on Apr. 18, 2023.

* cited by examiner

DEVICE FOR MEASURING INTRINSIC AUTOFLUORESCENCE OF A BIOLOGICAL SAMPLE AND METHOD USING THEREOF

FIELD

The present invention relates to a device, in particular a microscope, and to an imaging method using thereof, which is capable of exciting and measuring intrinsic autofluorescence coming from molecules present in various biological samples, for example autofluorescent molecules including metabolites, differentiating and quantifying the presence of these molecules by their spectral signature in a biological sample in a non-invasive manner and, based on that, assessing the quality of said biological sample. The present device and method are in particular useful for classifying quality of human embryos before its implantation.

BACKGROUND

Autofluorescence is the natural emission of light, in the ultraviolet (UV)-visible and near-infrared (IR) spectral range, from biological substrates when they are excited with light (photons) at a suitable wavelength, better known as at the resonance frequency. This is possible thanks to the single photon absorption effect (SPA). SPA is a linear absorption process where with only one photon there is enough energy to excite the electrons in an atom or molecule from one energy state, usually the ground state, to an excited state. After excitation, the electrons will drop back down to its stable state and during this process it releases a photon of light that can be collected and detected by a detector. Some auto-fluorescent molecules present in organic material are NADH (free and bound), retinol, folic acid, FAD, among others.

However, this SPA effect has some limitations speaking of terms in the microscopy field. The laser will either excite the molecules throughout a sample with light in and out the focal plane (e.g. in confocal microscopy). This leads to more out of focus excitation, causing faster photobleaching, which is the gradual decline of most fluorophore's ability to fluoresce, phototoxicity (the imaged organisms/cells are damaged) and the signal superposition from neighborhood molecules that could make the image blurry and difficult to interpret. The most used auto-fluorescent molecules or fluorescent dyes have excitation spectra in the 300 to 600 nm range. Light from the visible spectrum scatters a lot in biological tissue; severely limiting the depths it can penetrate with enough power to excite a fluorophore, e.g., single photon confocal microscopy can only penetrate to about 200 μm inside biological tissues. The wavelength of light is proportional to its energy level, the shorter the wavelength the more energy it has. This is a linear relationship, such that a photon with a wavelength of 400 nm has twice the amount of energy as a photon that has a wavelength of 800 nm. Avoiding short wavelengths is desirable for biological imaging.

The two-photon absorption effect (TPA) would overcome the aforementioned problems: deep penetrance, sharp focusing, reduced photodamage. TPA is a non-linear effect where two photons of identical or different frequencies can excite electrons in a molecule from one energy state (usually the ground state) to a higher energy state in a single quantum event. After excitation, the electron will drop back down to its stable state and during this process it will release a photon of light. For this to occur, the two photons must hit the molecule within the femtosecond range (10e-15 seconds).

This requires a focused laser that can produce very fast pulses of light with a high power.

A key benefit of two-photon microscopy is its ability to restrict excitation to a thin focal volume in thick samples. The objective focal point is the only space with a high enough photon density to ensure simultaneous presentation of two photons to the fluorophore. The requirement for near simultaneous absorption of two photons means that excitation is only achieved near the focal plane where the laser light is most concentrated. This has two distinct advantages. One is that there is little tissue damage to the regions above and below the focal plane that are not being imaged. In addition, there is no out-of-focus light that could make the image blurry and difficult to interpret due the interference.

As commented before, light from the visible spectrum scatters a lot in biological tissue; severely limiting the depths it can penetrate with enough power to excite a fluorophore. The most used fluorophores have excitation spectra in the 300 to 600 nm range. The wavelengths used to excite the same dyes with two photons therefore usually fall in the range between 800 to 1,200 nm, in the infrared spectrum. Infrared light used for two-photon microscopy scatter much less than visible light in organic tissues. This means infrared laser light has enough power to excite fluorophores up to around 1 mm deep in living tissues.

On the other hand, a cornerstone in biological imaging is to develop efficient microscopes that can minimize the sample exposure to light, increase the imaging speed and reduce phototoxicity while at the same time allowing for high space and temporal resolution imaging. A strategy to improve some of these tradeoffs is a family of techniques termed collectively as Light Sheet Microscopy, also known as Selective Plane Illumination Microscopy (SPIM). As a general summary, SPIM uncouples the illumination and detection pathways allowing a more efficient illumination/detection strategy. This uncoupling expands the range of microscope strategies that can be built to acquire images in the optimal architecture that fits the requirements of many different types of samples.

The light sheet is typically created by a cylindrical lens creating a sheet of light at and around the focus point. Excitation is restricted to the plane of focus thus restricting out-of-focus light coming into the detector and additional phototoxic damage derived from unnecessary illumination. Alternative ways to achieve a light sheet include using a laser light created with a low numerical aperture objective and scan the beam fast in lateral directions. In any case a planar area of the sample is illuminated and simultaneously projected into a camera that collects the photons of the entire plane in a single acquisition. This fast acquisition strategy combined with the restrained light exposure significantly reduces the phototoxicity during SPIM imaging.

Light sheets (both static and scanned) have a hyperbolic profile in the x, z plane which gives an approximation to a planar illumination profile rather than generating an exact planar sheet. Several strategies can be employed to shape the beam for light-sheet fluorescence. These include but are not limited to: (a) Planar light sheets, (b) Digitally scanned light sheet (DSLM) which simulates light sheets by line-scanning a typical diffraction-limited Gaussian-distributed collimated laser beam both laterally and axially through the sample, (c) Two-photon excitation DSLM (2PE-DSLM) for better tissue penetration, (d) A 2PE-Bessel Beam light sheet for generating thin illumination and large field of view (FOV); (e) Airy beam in continuous or 2P mode, which also generates a thin layer with minor sidelobes useful to achieve isotropic resolution in 3D. More complex structured illumination methods include Lattice light sheet and LITE, lateral interference tilted excitation. Each of these methods and additional ones create a planar illumination with some advantages and disadvantages based on the compromise among the basic acquisition parameters, FOV, axial resolution and deep penetrance.

Equally diverse as the planar beam types are the different SPIM modalities. Several architectures can be assembled to optimize the illumination/acquisition strategy of the sample to image. The most common set up is composed by an illumination and a detection objective in an orthogonal configuration, but additional objectives, cameras, or space configuration can be designed to increase the illumination capabilities of the system. In the L-SPIM the light sheet is created by using a cylindrical lens in conjunction with a large Gaussian beam. The pre-shaped (flattened) beam is focused onto the back focal plane of a lens, sent through it, and the sheet is created. T-SPIM involves having two sheets from opposing sides which can be overlaid. The second sheet will increase imaging quality, especially in thick tissues, by compensating light scattering from the first one. Both sheets can be overlaid perfectly. Multi-view SPIM combines two excitation and two imaging light paths, where the cameras are synced with each other. For optimal resolution, the sample is imaged twice. First at 0° and a second time rotated typically by 45°. Objects imaged in XY can be resolved to a much higher detail compared to those objects resolved in Z. Inverted SPIM (iSPIM) and dual-view inverted SPIM (diSPIM) involve placing the objectives above the sample in a V-shape. The sample rests on a platform (petri dish or alike). Either the objectives are moved up and down to acquire z-stacks or the sample is relative to the objectives. In essence, iSPIM is L-SPIM but at a different angle and with the sample fixed onto a stage. In diSPIM, excitation and emission occur through both lenses. Excitation alternates between the two sides, as does the imaging.

Single objective SPIM include highly inclined and laminated optical sheet microscopy (HILO) and oblique plane microscopy (OPM). OPM provides a small, stationary light sheet through which the sample can be scanned using a typical piezo z-stage for volumetric imaging. However, this requires that at some point along the optical train the angled image field be corrected for (due to the oblique illumination). This is accomplished by projecting the image for detection by a second objective, which is placed at an angle correcting for the oblique geometry.

Spectral imaging is imaging that uses multiple bands across the electromagnetic spectrum. There are two main subcategories of spectral imaging, called multispectral and hyperspectral. Multispectral captures images in a small number of spectral bands, typically three to fifteen. Hyperspectral imaging combines two methodologies, spectroscopy (science of acquiring and explaining the spectral characteristics of matter) and imaging (process of making a visual representation of anything by scanning it with a detector and an electromagnetic beam). The goal of hyperspectral imaging is to obtain the spectrum for each pixel in the image of a scene, with the purpose of finding objects, identifying materials, or detecting processes. This technique divides images into wavelength bands extended beyond the visible.

For each pixel, a spectral image provides information about its intensity and spectrum. This is a 3D data set and can be viewed as a "cube" of information. Each point in the cube represents a single number and the spectral image is described as $I(x,y,\lambda)$, where x, y are the pixel coordinates and $\lambda$ the spectrum used in each specific band (also named channels). It can be viewed either as a superposition of images $Ii(x,y)$ collected each one using a different wavelength $\lambda$, or as a spectrum $I(\lambda)$ at every pixel (x,y), that is extracted from the superposition of all images $Ii(x,y)$. This can be extended in a perpendicular direction (z) from the x, y plane to be able to have a 3D reconstructed image, that is a 4D spectral image $I(x,y,z,\lambda)$.

There are four basic techniques for acquiring the three-dimensional $(x,y,\lambda)$ dataset of a spectral cube. The choice of technique depends on the specific application, seeing that each technique has context-dependent advantages and disadvantages. Three of these techniques are scanning-based imaging system methods. In this case the system operates by acquiring the spectrum of a single or simultaneous pixels from a x,y plane over a detector, when the spectrum of these pixels is measured, another concatenate region is measured, this is done continuously until all the spectrum from all desired field of view (total imaged area) is recorded. Then, moving the mechanism perpendicularly to the first x,y plane (i.e., z direction) the process is repeated continuously until all the desired z volume is measured. This is done by passing the light through a prism or galvanometric scanning mirror (high speed) in the optical path to the detector or translating the specimen with a mechanical stage (low speed).

On the other hand, in general, embryo profiling for prediction of pregnancy rates focuses mainly on visual profiles and short-term biomarkers including expression of RNA and proteins, preferably in the surroundings of embryos to avoid any damage to them. Embryo profiling for health prediction puts more focus on the genome, and where there is a risk of a genetic disorder it more often involves cell sampling from the embryo for preimplantation genetic diagnosis.

Current clinical procedures for recognizing viable embryos are subjective, these include time-lapse incubators, pre-implantation genetic screening and/or multiple embryo transfer. Time-lapse incubators include a built-in bright field microscope which allow monitoring embryo morphological changes but do not assess implantation potential; pre-implantation genetic testing (PGT) for aneuploidy discards embryos presenting genetic aberrations or specific genetic mutations, but neither of these two procedures demonstrates a significant increase in implantation/pregnancy rates, in addition, implanting multiple embryos can bring to multiple pregnancies implying many health complications and high costs.

SUMMARY

In view of the above, there is still a need to provide a device, in particular a microscope, and a method using thereof capable of classifying the health status of biological samples by their spectral signature, in particular embryos, by exciting and measuring intrinsic autofluorescence coming from molecules present in said biological samples in a non-invasive manner.

The present inventors have developed a device and a method using thereof with which it is possible to measure intrinsic autofluorescence coming from molecules, such as metabolites, present in biological samples, in a non-invasive manner. With the device of the present invention minimization of potential photo-damage by using two-photon excitation of the auto-fluorescence in a "light-line", light sheet, or virtual light sheet configurations with orthogonal objectives optics is achieved. This, among other features of the device, allows to classifying the quality of said biological samples, in particular quality of live embryos, in real time.

The device of the present invention has a mounting configuration which is very similar to classical ways of mounting samples, which are customary at clinics and biological laboratories, thus it will be easier for said device to be used by end-users. On the other hand, it avoids mounting the sample in a capillary or cuvette or cylinder setting, which are required by typical light-sheet microscopes.

Therefore, one objective of the present invention is to provide a device for measuring intrinsic autofluorescence of molecules present in a biological sample wherein said device comprises:

a) a light-sheet, virtual light-sheet or light line delivery pathway module comprising a laser generator capable of generating ultrashort pulses with a duration between 1 microsecond and 1 attosecond, and optical elements shaping the laser light into a light sheet, virtual light-sheet or light-line;

b) an imaging chamber comprising an imaging dish inside of which said biological sample is placed, a translational stage, an illumination objective and a collection objective both immersed in an immersion liquid in a sealed immersion chamber, wherein both objectives are positioned below the imaging dish, wherein said immersion chamber is placed inside an incubation chamber, allowing environmental control; and c) a fluorescence detection pathway comprising optical elements, light-splitting elements such as diffractive elements or dichroic mirrors, an array detector, and a device control and signal processing unit; wherein said fluorescence detection pathway has means for collecting the spectrum of fluorescence of said biological sample building a multi or hyper spectral data cube.

To achieve the two-photon excitation of the sample, preferably an ultrashort pulse laser generator is used. Preferably, said laser generator generates ultrashort pulses with a duration between 1 microsecond and 1 attosecond, more preferably between 5 femtoseconds and 900 femtoseconds, more preferably between 50 femtoseconds and 600 femtoseconds, even more preferably between 100 femtoseconds and 300 femtoseconds. Preferably, the pulse repetition frequency is from 1 Hz to 1 GHz with an average output power between 0.1 to 100 Watts. Preferably, said laser generator generates a laser with a wavelength from 300 nm to 1,200 nm, more preferably between 500 nm and 1,100 nm, even more preferable between 740 nm and 820 nm. Any lasers generator with similar parameters that achieve the same TPA effect could be used in the present invention.

The laser beam passes through a series of optical elements on the delivery path, which allow controlling its shape and directionality. Preferably, said optical elements of the delivery pathway are lens, light shaping elements, slits, scanning mirrors, or combination thereof.

In a first embodiment, the light shaping elements of the delivery pathway are able to generate a propagation invariant laser beam, propagating along the X direction. Effectively, this illuminates a single line from the sample (along the X direction), referred as light-line. Using the scanning mirror and the sample translational stage, this light-line is moved relatively to the sample, scanning the whole volume of the sample. The detection is done by a collection objective positioned in perpendicular direction to the light propagation—in Z direction—and the signal is collected one X-line at a time. This is called light-line multi-photon hyperspectral (HS) imaging.

In a second embodiment, the light shaping elements of the delivery pathway are able to generate a propagation invariant laser beam, propagating along the X-direction, similarly to the first embodiment. Effectively, this illuminates a single line from the sample (along the X direction). However, in contrast to the above embodiment, in this case, the light-line is rapidly scanned in the perpendicular direction (Y direction) by a resonant scanner, effectively forming a virtual light-sheet in the XY-plane. The term "rapidly" is in comparison to the acquisition speed of the camera. This is called virtual light-sheet multi-photon HS imaging.

In a further embodiment, the light shaping elements of the delivery pathway are able to directly generate a light-sheet in the XY-plane, for example by using a cylindrical lens, or a spatial light modulator. This is called light-sheet multiphoton HS imaging.

In the device of the present invention, the generated XY light-sheet is scanned across the sample in the perpendicular direction (Z-direction) or the light-line is scanned across the sample in the perpendicular directions (Y and Z-direction), thus achieving scanning over the full volume of the sample. In one embodiment, the relative scanning of the sample is carried out maintaining the light-sheet or light-line static, while the sample is mounted on a translational stage. In another embodiment, the sample is held static, while the light-sheet or light-line is scanned using the scanning mirror. Both embodiments can be used in combination. The device of the present invention includes both options.

In addition, by using the scanning mirror and/or the translational stage, scanning of the light-sheet or light-line across the sample volume can be done in two different manners. In one embodiment, this is done plane by plane. In another embodiment, this is done plane by plane, but at a speed much faster than the acquisition speed of the camera, thus resulting in quasi-simultaneous illumination of the whole sample.

Preferably, the device also contains a wide-field illumination source, for example a white diode, attached to a flexible hand, which is located close to the sample, for example above the sample and provides upon user request a mobile ambient illumination in the imaging chamber. One the one hand, this facilitates sample navigation. On the other hand, it allows to obtain quasi-bright field or quasi-dark field images of the sample, which are similar to the ones typically used in laboratories or clinics for studying and classifying samples and can be used as a reference.

Preferably, the bottom part of the imaging dish of the imaging chamber is made of a material with a refractive index as close as possible to the refractive index of water (n=1.3325). More preferably, said material is selected from polytetrafluoroethylene (PTFE) or fluorinated ethylene propylene (FEP).

Preferably, said illumination objective and said collection objective are positioned under the imaging dish, at approximately 45 degrees with respect to the bottom part of the imaging dish and at approximately 90 degrees with respect to each other.

Preferably, the incubation chamber comprises controlling means so that several environmental parameters are controlled. Therefore, in the incubation chamber several environmental parameters are controlled, such as temperature, humidity, pH, $CO_2$ and $O_2$ concentrations. The controlling means control the temperature so that the temperature in the incubation chamber is the optimal temperature for the relevant sample under observation.

Preferably, said optical elements of the detection pathway are laser light filters, lens, light shaping elements, slits, mirrors and/or de-scanning mirrors, light splitting elements, such as diffractive elements or dichroic mirrors, or combination thereof.

In the above-mentioned first embodiment, in the detection pathway the fluorescence generated by the light-line illumination in X-direction is directed to a de-scan mirror. The de-scan mirror ensures that while the sample volume is scanned by the laser light-line, the fluorescence light-line is always projected on the same position. A slit is effectively the entrance slit of a diffractive element such as a prism, a grating, or similar element.

The latter is used to disperse and spatially separate the different wavelengths contained in the fluorescence spectrum. Thus, the fluorescence spectrum of the light-line is dispersed along the perpendicular direction to the light-line. The fluorescence is then focused and shaped to match a detector size of an array detector such as a CCD camera, CMOS camera, or similar detector. Effectively, this forms an image on the array detector, where one dimension corresponds to the spatial information contained in the illuminated light-line from the sample (X-direction), and the second dimension encodes the spectrum of the fluorescence in the corresponding pixel from the light-line. As the light-line is scanned across the sample volume, a multi or hyper spectral data cube is built, which contains for each point of the sample, the sample coordinates X, Y, Z, and a fluorescence spectrum. The number of color channels in which the spectrum is binned is determined by the used diffractive optics and the number of pixels on which the spectrum is projected at the detector array. In this configuration, the spectrum can be obtained with resolution down to few nanometers to tens of nanometers. The system can be later calibrated with calibration standards to find the correspondence between pixel number and fluorescence color. To obtain a quasi bright-field or quasi dark-field image of the sample, the laser source is switched off, the wide field source is positioned accordingly close to the sample, and the light collected by the collection objective is directed and focused on the camera, bypassing the de-scanning mirror, the slit and the diffractive elements.

In the above-mentioned second embodiment, the fluorescence coming from the XY light-sheet or virtual light-sheet illuminated plane is directed to a dichroic mirror. The latter splits the light in two, and it is chosen to transmit light above a certain wavelength $\lambda 1$ and reflect the remaining light. The process of splitting the fluorescence in two is further repeated at two further dichroic mirrors, with respective threshold wavelengths of $\lambda 2$ and $\lambda 3$. The threshold wavelengths selection is depending on the spectra which need to be detected. Following this process, the original multi-color fluorescence image of the light-sheet illuminated X-Y plane of the sample is split into 4 images, corresponding to 4 spatially separated color channels. In turn, the detection area of the array detector is virtually split into 4 equal parts, where the 4 fluorescence image channels are imaged simultaneously through sets of re-directing mirrors and focusing lenses. Effectively, the array detector registers an image, containing 4 images of the sample, each of which corresponds to the fluorescence spectrum of the sample in a particular color-band. Scanning the X-Y light-sheet across the volume of the sample yields the multispectral data cube. The latter contains the X, Y, Z coordinates of each pixel and its spectrum. The spectrum only contains 4 data points, obtained from each of the respective color bands. While this might give somewhat limited fluorescence spectra information, it is sufficient for differentiating healthy vs non-healthy bio-samples via the subsequently employed data analysis approach via dimensional reduction such as phasor analysis. Additionally, artificial intelligence can also be used to classify the spectral profile obtained. To obtain a quasi bright-field or quasi dark-field image of the sample, the laser source is switched off, the wide field source is positioned accordingly close to the sample, and the light collected by the collection objective is directed and focused on the camera, bypassing the dichroic mirrors.

The above embodiment describes the use of 3 dichroic mirrors, resulting in an image with 4 color channels. However, it is also possible to include additional set of dichroic mirrors (with different threshold wavelengths) at the same positions and interchange automatically between the two sets of dichroic mirrors. This would allow obtaining two sequential images, each of 4 different color channels. Thus, effectively, an 8-channel image can be obtained. This can be repeated further if needed to obtain more channels.

Preferably, said array detector in the detection pathway is a charge-coupled device (CCD) camera or an Electron Multiplying CCD (EMCCD) camera or a complementary metal oxide semiconductor (CMOS) camera or a scientific CMOS (SCMOS) camera.

This way, the inventors provide a device comprising an emission light-sheet based on a multiphoton laser to achieve the two-photon excitation of the sample, which is placed in an imaging dish inside an incubation chamber allowing complete environmental control, and a fluorescence detection path for collecting the fluorescence spectrum emitted by the sample in the ways described above, to allow classifying biological samples with intrinsic autofluorescence molecules using a snapshot technique that reduces light damaging of the samples, combined with a fast processing speed, reduced data storage and that provides raw images immediately interpretable.

In a second aspect, the present invention relates to a method for assessing quality of a biological sample by measuring intrinsic autofluorescence of molecules present in a biological sample, using the device described above.

Said method comprises the steps of:
a) obtaining raw multi or hyper spectral images from the fluorescence signal emitted by the biological sample using the device of the present invention;
b) image processing of the spectral images obtained in step (a); and
c) classifying the processed images obtained in step (b).
Optionally, standard quasi bright-filed or quasi-dark field images are obtained in step (a).

The image processing in step (b) of the method of the present invention comprises basic image processing, such as background removal, noise removal, signal normalization, image segmentation, image processing by dimensionality reduction such as building phasor representation, or histogram representation, signal unmixing in which each HS image is split in several images, each corresponding to the position and intensity of the signal coming from a single auto-fluorescence molecule, among other steps known to the skilled person.

Optionally the raw HS images and the quasi bright-filed or quasi-dark field images obtained in step (a) are also classified.

To build the phasor representation of step (b), the spectrum of each raw pixel is normalized and then Fourier transformed and the real (amplitude G) and imaginary (phase S) part of the n-th (typically first/second, n=1,2) harmonic are used as coordinates in a scatter (phasor) plot.

Each pixel in the phasor plot corresponds to a different spectrum from the original multi or hyper spectral image.

Thus, similar spectra originating at different locations in the raw multi or hyper spectral image are located in the same pixel (or neighbouring pixels) on the phasor plot. Effectively, the original raw multi-dimensional spectral image is binned into a histogram, thus its dimensionality is reduced to a 2D phasor plot. The phasor plot contains characteristic features, determined by the composition and quantity of auto-fluorescent compounds in the sample. These features, for example the center of mass of the phasor for a particular specimen can be used as an indicative factor for the quality of the specimen.

To build a histogram of the multi or hyper spectral information in the sample, all spectra from all pixels are summed up to obtain one spectrum, that has numerous features, characteristic for the auto-fluorescence of the particular sample. These features can be further used as an indicative factor for the quality of the specimen.

The spectrum obtained is step (b) is a composite spectrum to which potentially several auto-fluorescent molecules have contributed, thus it is often beneficial to unmix the raw spectral data to the contribution of these individual auto-fluorescent molecules. Although spectral unmixing can be performed in several ways, it could be done identifying reference spectral positions for the pure auto-fluorescent molecules present in the sample. These can be obtained either in separate experiments by imaging pure solutions of said molecules or it can be directly obtained from areas in the original images, which contain only signal from said single molecules, if such exist.

Effectively during the unmixing procedure, for the composite spectrum in each pixel of the original image, the relative contribution of the spectra of the different pure auto-fluorescent molecule which have contributed to the formation of that composite spectrum is calculated. The unmixed spectral data can be mapped back to its original position on the HS image, thus yielding, for example, characteristic maps of the embryo, one for each different auto-fluorescent molecule, as shown in FIGS. 2 and 4. These maps can provide complementary quantitative information about the concentration and spatial distribution of the different auto-fluorescent molecules. Thus, they can be used as complementary information for assessing the quality of the biological specimen.

Once the raw HS images, or the quasi bright-field/quasi dark field images have been obtained and the histogram phasor plot and the unmixed images have been built for each imaged sample, an independent assay to assess the quality of the samples and correlate them with the raw HS images, or the quasi bright-field/quasi dark field images, the histogram, the phasor and the unmixed images is used. Once such libraries of healthy and non-healthy samples and correlated images are built, then the next step is assessing the quality of a previously unknown biological sample. This step can be also boosted by applying machine learning algorithms.

With the method of the present invention it is possible to classify the biological sample, including but not limited to cell, embryos, fluids, or any other biological material based on its auto-fluorescent profile. This classification discriminates viable embryos for implantation from non-viable ones, healthy oocytes from non-healthy ones, between tumors and normal cells, between infected and healthy tissue, or any other quality with an impact on the molecular composition of the biological sample.

Preferably, the biological sample can be selected from a list comprising cells, biopsy tissues, organoids, oocytes, embryos, biological fluids such as blood, plasma, saliva, semen, urine, or any other biological sample provided that auto-fluorescent molecules are present in said biological sample. More preferably, said biological sample is an embryo, even more preferably is a human embryo.

Preferably, auto-fluorescent molecules present in the biological sample to be measured can be selected from a list comprising nicotinamide adenine dinucleotide in the reduced state (NADH) both free and bound to a protein, flavin adenine dinucleotide (FAD), retinol, retinoic acid, folic acid, lipo-pigments such as lipofuscin and protoporphyrin IX (PPIX), elastin or proteins such as collagen.

BRIEF DESCRIPTION OF THE DRAWINGS

Hereinafter, the present invention is described with reference to figures, which however are not intended to limit the present invention.

DETAILED DESCRIPTION

Figure 1:
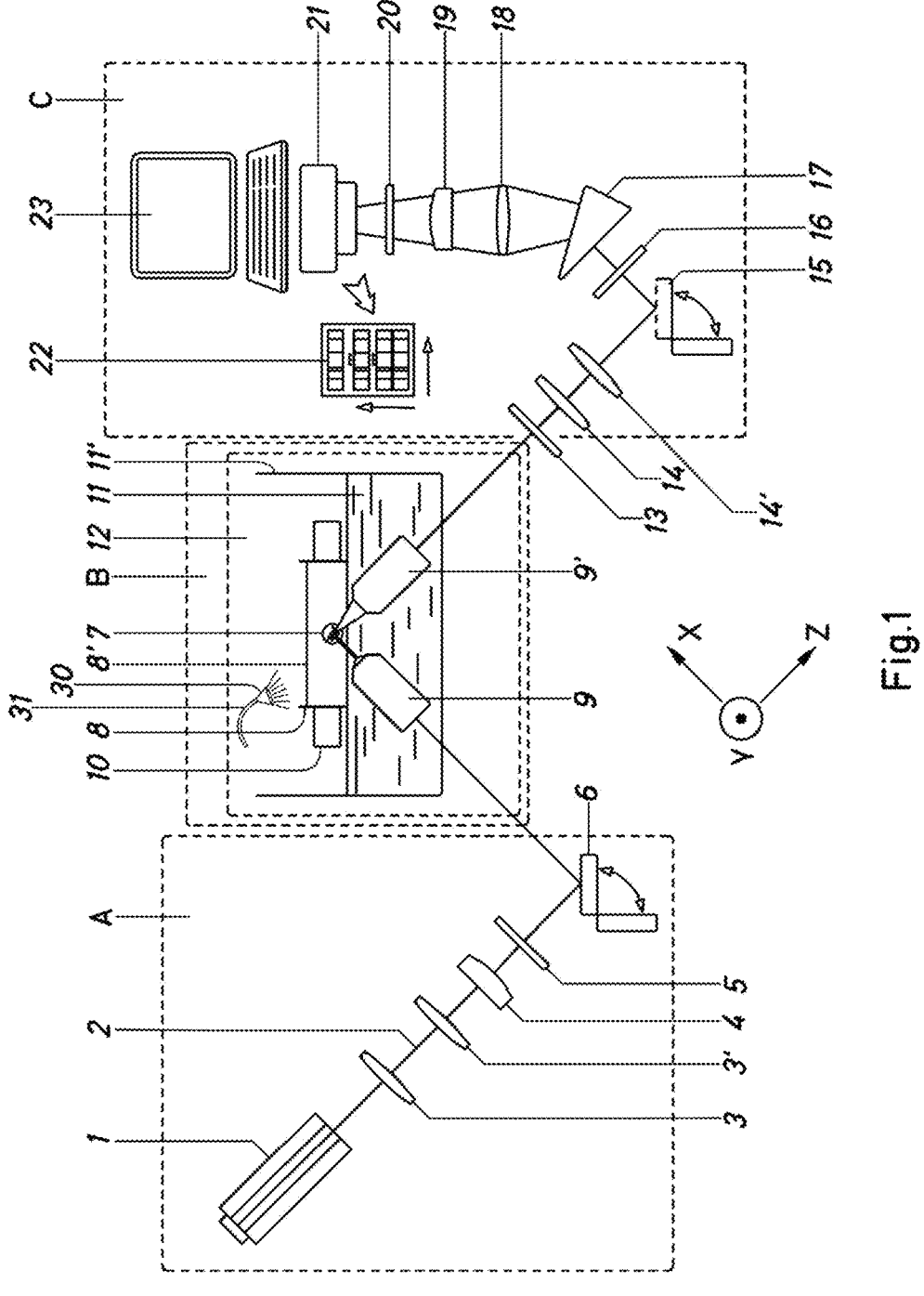
FIG. 1 shows a schematic diagram of a first embodiment of the device of the present invention.

FIG. 1 depicts a schematics of a first embodiment of the device of the present invention. Three different zones or modules are shown (A, B, and C). Zone A is the light-sheet delivery pathway comprising a ultra-short pulsed laser generator -1-. The laser beam generated with this generator is in the near-infrared (NIR) region. The laser beam -2- passes through a series of optical elements which allow controlling its shape and directionality. The purpose of lenses -3, 3'- is to form a telescope system, able to expand or reduce the laser-beam diameter. The lenses are followed by a light-shaping element -4-, which can be a cylindrical lens, a mask, a spatial light modulator, a slit -5-, or a combination of these, which function is to achieve shaping of the laser beam into the desired light-line. The light shaping elements generate a propagation invariant laser beam propagating along the X direction. Effectively, this illuminates a single line from the sample (along the X direction). Using the scanning mirror -6- and the sample translational stage, this light-line is moved relatively to the sample, scanning the whole volume of the sample.

Zone or Module B is the imaging chamber. The biological sample -7-, which could be an embryo or cells, biopsy tissues, organoids, blood, plasma, or any other biological tissue, tissue or fluid is positioned inside an imaging dish -8- and immersed in a biological culture media -8'-. The bottom part of the imaging dish -8- is made of a material with a refractive index as close as possible to the refractive index of water (n=1.3325), for example polytetrafluorethylene (PTFE), fluorinated ethylene propylene (FEP), or other similar materials. Matching of the refractive indices of the biological media -8'-, the objective immersion liquid -11- and the imaging dish bottom ensures minimal distortion of the light and minimal imaging artifacts generated at the respective interfaces. This is especially important in the chosen imaging geometry where the objectives -9, 9'- are positioned under the imaging dish, at approximately 45 degrees from the imaging dish bottom. The imaging dish -8- is mounted on the translational stage -10-, allowing both coarse positionings of the sample within the field of view and scanning of the sample across a static light-line. The light-line is delivered through the illumination objective -9-. The ultra-short NIR pulses generate a broad intrinsic auto-fluorescence from the sample. This fluorescence signal is mainly in the visible part of the spectrum and much of it is coming from various molecules (e.g., metabolites), indicative for the health or metabolic status of the biological sample. The fluorescence is collected by the collection objective -9'- and sent further on the "Fluorescence detection pathway" (Zone or Module C). Both objectives -9, 9'- are inserted into a sealed immersion chamber -11'- and immersed in an immersion liquid -11- with refractive index matching the one of the biological media -8'-, usually water. The objectives -9, 9'- are positioned in an inverted configuration below the sample -7- and the imaging dish -8-. The sample is illuminated by the light-line with an angle of approximately 45 degrees from the basis of the imaging dish -8-, and approximately 90 degrees with respect to the other objective, although several configurations are possible, depending on the particular set of objectives used. The whole immersion chamber -11'- is placed inside an incubation chamber -12-, which comprises controlling means allowing environmental control: maintaining stable physiological temperature (typically 37° C.), adjusting humidity, $CO_2$ and $O_2$ concentrations and pH. The imaging chamber also contains a wide-field source -30- mounted on a flexible arm -31- to obtain quasi bright-field or quasi dark-field images.

Zone or Module C is the detection pathway. The auto-fluorescence collected by the collection objective -9'- is first directed through a near infrared (NIR) filter -13-, used to cut-off any remaining light from the excitation laser. Then, it passes through another telescope system (lenses -14, 14'-), to adjust the size of the beam. From here on, the fluorescence (generated by the light-line illumination in X-direction) is directed to a de-scan mirror -15-. The de-scan mirror -15- ensures that while the sample volume is scanned by the laser light-line, the fluorescence light-line is always projected on the same position on slit -16-. This slit -16- is effectively the entrance slit of a diffractive element -17-. The diffractive element -17- is used to disperse and spatially separate the different wavelengths contained in the fluorescence spectrum. Thus, the fluorescence spectrum of the light-line is dispersed along the perpendicular direction to the light-line. The fluorescence is then focused through lens -18-, and shaped through light shaping element -19- and slit -20- to match the detector size of an array detector -21-, that can be a charge-coupled device (CCD) camera, a complementary metal oxide semiconductor (CMOS) camera, or any similar detector. Effectively, this forms an image -22- on the array detector, where one dimension corresponds to the spatial information contained in the illuminated light-line from the sample (X-direction), and the second dimension encodes the spectrum of the fluorescence in the corresponding pixel from the light-line. As the light-line is scanned across the sample volume, a hyperspectral data cube is built, which contains for each point of the sample, the sample coordinates X, Y, Z, and a fluorescence spectrum. The number of color channels in which the spectrum is binned is determined by the used diffractive optics and the number of pixels on which the spectrum is projected at the detector array. In this configuration, the spectrum can be obtained with resolution down to few nanometers to tens of nanometers. The system will be calibrated with calibration standards to find the correspondence between pixel number and fluorescence color. The data is analyzed and classified using a software in the device control and signal processing unit -23-.

Figure 2:
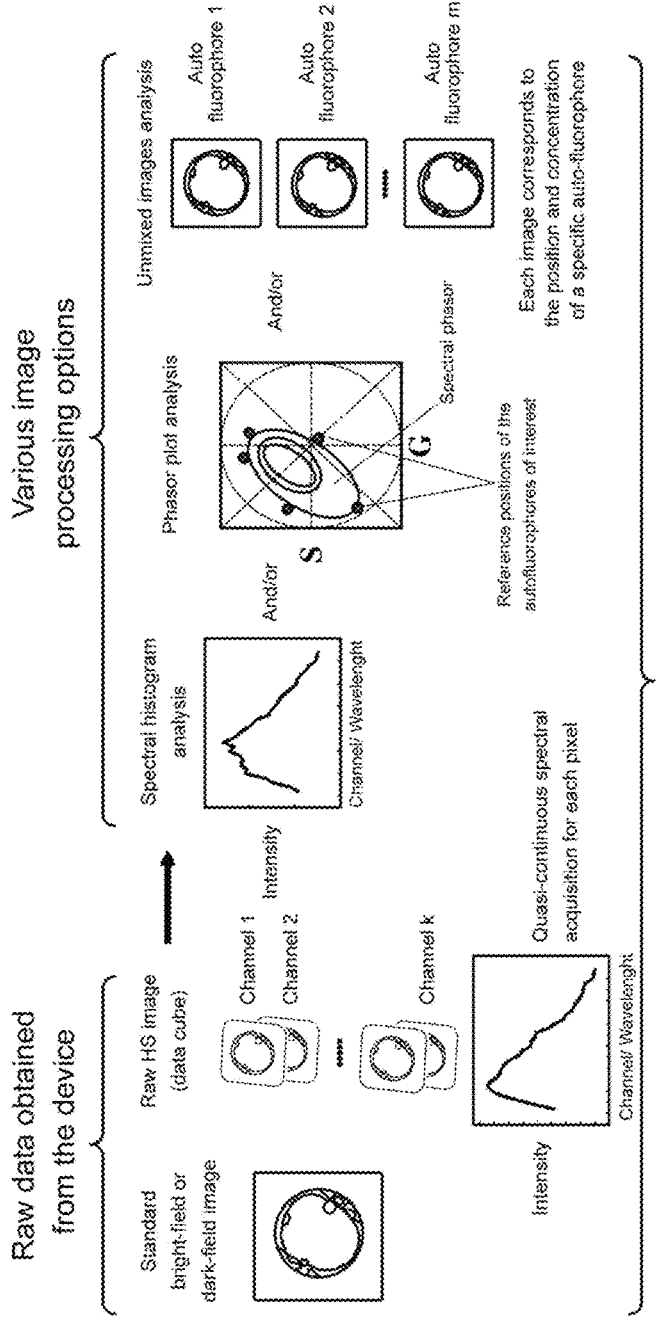
FIG. 2 is a graphic of the data obtained from an embryo using the device of FIG. 1.

FIG. 2 is a graphic of the data obtained from an embryo using the device of FIG. 1. As raw data, the device obtains raw HS images, which are multi-dimensional, as each pixel of the image contains a quasi-continuous auto-fluorescent spectrum. Alternatively this can be perceived as a data cube of numerous images, where each image corresponds to a particular color channel. The device can also obtain a quasi bright field or a quasi dark-field image of the sample. The image analysis comprises various steps, for example building a spectral histogram, a phasor plot representation and unmixing the HS images to the contribution of different auto-fluorophores. The reference spectra for the pure auto-fluorophores used for the unmixing can be identified as points on the phasor plot. All this data can be analyzed statistically and subjected to classification to obtain characteristic auto-fluorescent profiles linked to the quality of the sample, in the particular case—an embryo. Every profile from every embryo is compared to reference control plots from viable embryos, which allows to classify the quality of said embryo. Further on, this allows the classification of viables and non-viable embryos.

Figure 3:
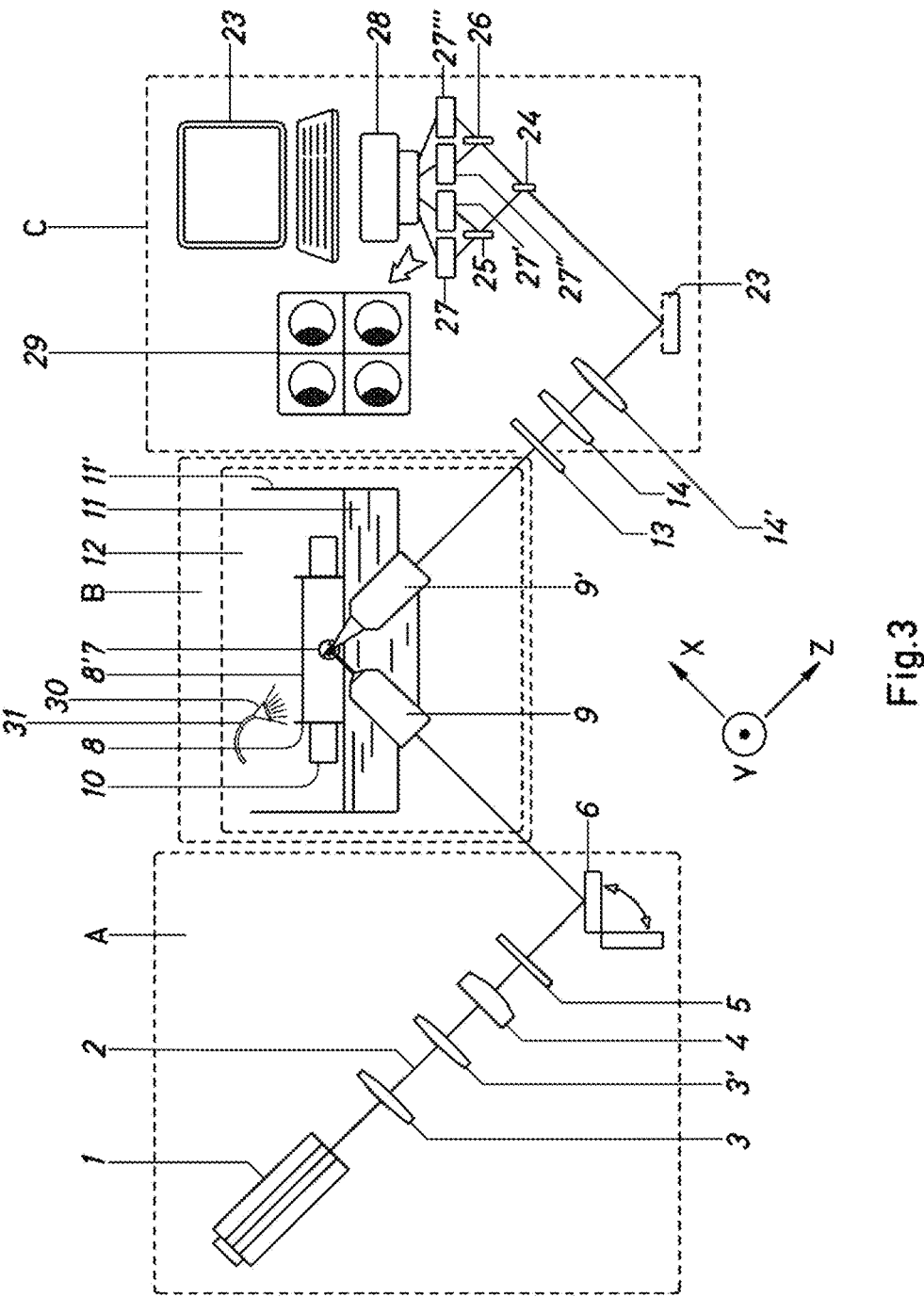
FIG. 3 shows a schematic diagram of a second embodiment of the device of the present invention.

FIG. 3 depicts a schematics of another embodiment of the device of the present invention. Three different zones or modules are shown (A, B, and C). Zone A is the light-sheet/virtual light-sheet delivery pathway comprising a ultra-short pulsed laser generator -1-. The laser beam generated with this generator is in the near-infrared (NIR) region. The laser beam -2- passes through a series of optical elements which allow controlling its shape and directionality. The purpose of lenses -3, 3'- is to form a telescope system, able to expand or reduce the laser-beam diameter. The lenses are followed by a light-shaping element -4-, which can be a cylindrical lens, a mask, a spatial light modulator, a slit -5-, or a combination of these, which function is to achieve shaping of the laser beam into the desired shape: (i) light-sheet or (ii) light-line for constructing a virtual light sheet. For the former the light shaping elements are generating directly a light-sheet in the XY plane, for example via a cylindrical lense. For the latter, the light shaping elements generate a propagation invariant laser beam propagating along the X direction, which effectively illuminates a single line from the sample (along the X direction). Then, this light-line is scanned rapidly in Y direction to achieve a virtual light sheet in the XY plane, where rapidly is compared to the acquisition speed of the camera. In either case, using the scanning mirror -6- and the sample translational stage -10-, this light-sheet/virtual light-sheet is moved relatively to the sample, scanning the whole volume of the sample.

Zone or Module B is the imaging chamber. The biological tissue sample -7-, which could be an embryo or cells, biopsy tissues, organoids, blood, plasma, or any other biological tissue, tissue or fluid is positioned inside an imaging dish -8- and immersed in a biological media -8'-. The bottom part of the imaging dish -8- is made of a material with a refractive index as close as possible to the refractive index of water (n=1.3325), for example polytetrafluorethylene (PTFE), fluorinated ethylene propylene (FEP), or other similar materials. Matching of the refractive indices of the biological media -8'-, the objective immersion liquid -11- and the imaging dish bottom ensures minimal distortion of the light and minimal imaging artifacts generated at the respective interfaces. This is especially important in the chosen imaging geometry where the objectives -9, 9'- are positioned under the imaging dish, at approximately 45 degrees from the imaging dish bottom. The imaging dish -8- is mounted on the translational stage -10-, allowing both coarse positionings of the sample within the field of view and scanning of the sample across a static light-sheet. The light-sheet or virtual light-sheet is delivered through the illumination objective -9-. The ultra-short NIR pulses generate a broad intrinsic auto-fluorescence from the sample. This fluorescence signal is mainly in the visible part of the spectrum and much of it is coming from various molecules (e.g., metabolites), indicative for the health or metabolic status of the biological sample. The fluorescence is collected by the collection objective -9'- and sent further on the "Fluorescence detection pathway" (Zone or Module C). Both objectives -9, 9'- are inserted into a sealed immersion chamber -11'- and immersed in an immersion liquid -11- with refractive index matching the one of the biological media 8'-, usually water. The objectives -9, 9'- are positioned in an inverted configuration below the sample -7- and the imaging dish -8-. The sample is illuminated by the light-sheet with an angle of approximately 45 degrees from the basis of the imaging dish -8-, and approximately 90 degrees with respect to the other objective, although several configurations are possible, depending on the particular set of objectives used. The whole immersion chamber -11'- is placed inside an incubation chamber -12-, which comprises controlling means allowing environmental control: maintaining stable physiological temperature (typically 37° C.), adjusting humidity, $CO_2$ and $O_2$ concentrations and pH. The imaging chamber also contains a wide-field source -30- mounted on a flexible arm -31- to obtain quasi bright-field or quasi dark-field images.

Zone or Module C is the detection pathway. The auto-fluorescence collected by the collection objective -9'- is first directed through a NIR filter -13-, used to cut-off any remaining light from the excitation laser. Then, it passes through another telescope system (lenses -14, 14'-), to adjust the size of the beam. From here on, the fluorescence is directed to a mirror -23-. The fluorescence (coming from the XY light-sheet illuminated plane) is directed to a dichroic mirror -24-. Said dichroic mirror -24- splits the light in two, and it is chosen to transmit light above a certain wavelength λ1 and reflect the remaining light. The process of splitting the fluorescence in two is further repeated at dichroic mirrors -25- and -26-, with respective threshold wavelengths of λ2 and λ3. The threshold wavelengths selection is depending on the spectra which need to be detected. Following this process, the original multi-color fluorescence image of the light-sheet illuminated XY plane of the sample is split into 4 images, corresponding to 4 spatially separated color channels. In turn, the detection area of the array detector is virtually split into 4 parts, where the 4 fluorescence image channels are imaged simultaneously through sets of re-directing mirrors and focusing lenses -27, 27', 27'', 27'''-. Effectively, the array detector -28- registers an image -29-, containing 4 images of the sample, each of which corresponds to the fluorescence spectrum of the sample in a particular color-band. Scanning the XY light-sheet across the volume of the sample yields the multispectral data cube. The latter contains the X, Y, Z coordinates of each pixel and its spectrum. The spectrum only contains 4 data points, obtained from each of the respective color-bands. This information is sufficient for differentiating healthy vs non-healthy bio-samples via the subsequently employed data analysis approach via dimensional reduction such as phasor analysis. Artificial intelligence can also be used to classify the spectral profile obtained.

Figure 4:
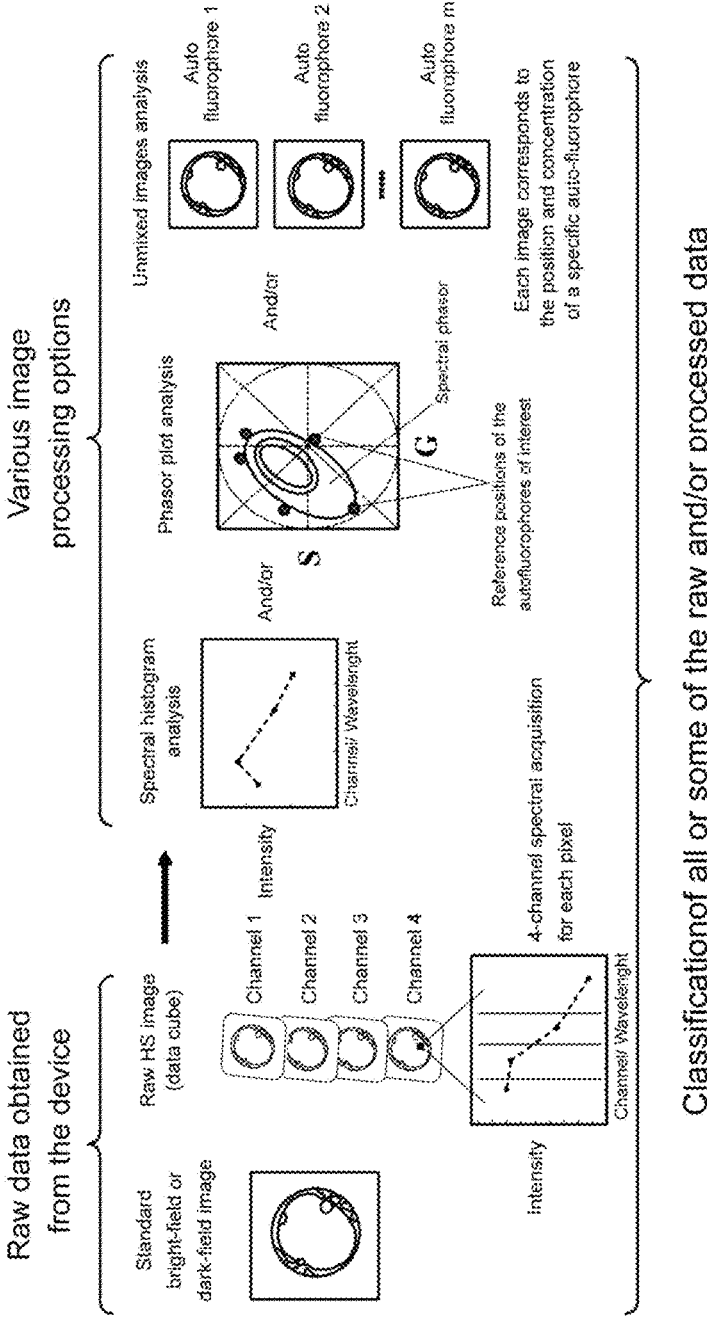
FIG. 4 is a graphic of the data obtained from an embryo using the device of FIG. 3.

FIG. 4 is a graphic of the data obtained from an embryo sample using the device of FIG. 3. As raw data, the device obtains raw HS images, which are multi-dimensional, in this case each pixel of the image contains a 4-point auto-fluorescent spectrum. Alternatively this can be perceived as a data cube of 4 images, where each image corresponds to a particular color channel. The device can also obtain a quasi bright field or a quasi dark-field image of the sample. The image analysis comprises various steps, for example building a spectral histogram, a phasor plot representation and unmixing the HS images to the contribution of different auto-fluorophores. The reference spectra for the pure auto-fluorophores used for the unmixing can be identified as points on the phasor plot. All this data can be analyzed statistically and subjected to classification to obtain characteristic auto-fluorescent profiles linked to the quality of the sample, in the particular case—an embryo. Every profile from every embryo is compared to reference control plots from viable embryos, which allows to classify the quality of said embryo. Further on, this allows the classification of viable and non-viable embryos.

What is claimed is:

1. A device for measuring intrinsic autofluorescence of molecules present in a biological sample, wherein said device comprises:

a) a light-sheet, virtual light-sheet or light line delivery pathway module comprising a laser generator capable of generating ultrashort pulses with a duration between 1 microsecond and 1 attosecond, and optical elements shaping the laser light into a light sheet, virtual light-sheet or light-line;

b) an imaging chamber comprising an imaging dish inside of which said biological sample is placed, a translational stage, an illumination objective and a collection objective both immersed in an immersion liquid in a sealed immersion chamber, wherein both objectives are positioned below the imaging dish, wherein said sealed immersion chamber is placed inside an incubation chamber, allowing environmental control; and c) a fluorescence detection pathway comprising optical elements, light-splitting elements such as diffractive elements or dichroic mirrors, an array detector, and a device control and signal processing unit, wherein said fluorescence detection pathway has means for collecting spectrum of fluorescence of said biological sample building a multi or hyper spectral data cube.

2. The device, according to claim 1, wherein said laser generator generates a laser beam with a wavelength in the range from 300 nm to 1,200 nm.

3. The device, according to claim 1, wherein a pulse repetition frequency of said laser generator is in the range from 1 Hz to 1 GHz with an average output power between 0.1 to 100 Watts.

4. The device, according to claim 1, wherein said optical elements of the delivery pathway are lens, light shaping elements, slits, scanning mirrors, or combination thereof.

5. The device, according to claim 1, wherein the bottom part of the imaging dish of the imaging chamber is made of a material with a refractive index as close as possible to the refractive index of water (n=1.3325).

6. The device, according to claim 5, wherein the bottom part of the imaging dish of the imaging chamber is made of a material selected from polytetrafluoroethylene (PTFE) or fluorinated ethylene propylene (FEP).

7. The device, according to claim 1, wherein said illumination objective and said collection objective are positioned under the imaging dish, at approximately 45 degrees with respect to the bottom part of the imaging dish and at approximately 90 degrees with respect to each other.

8. The device, according to claim 1, wherein the incubation chamber comprises controlling means capable of measuring and controlling several environmental parameters, such as temperature, humidity, pH, $CO_2$ and $O_2$ concentrations.

9. The device, according to claim 1, wherein said optical elements of the fluorescence detection pathway are lenses, mirrors, light-splitting elements such as a diffractive elements or dichroic mirrors, slits, de-scanning mirrors, or combination thereof.

10. The device, according to claim 1, wherein said array detector in the fluorescence detection pathway is a charge-coupled device (CCD) camera or an Electron Multiplying CCD (EMCCD) camera or a complementary metal oxide semiconductor (CMOS) camera or a scientific CMOS (SC-MOS) camera.

11. The device, according to claim 1, wherein the fluorescence detection pathway comprises a de-scanning mirror to which the fluorescence generated by the light-line illumination in X-direction is directed.

12. The device, according to claim 11, wherein one dimension of the image formed in the array detector of the fluorescence detection pathway is a spatial information contained in the illuminated light-line from the biological sample (X direction), and a second dimension is the spectrum of fluorescence in a corresponding pixel from the light-line for each point of the biological sample.

13. The device, according to claim 1, wherein the detection pathway comprises at least three dichroic mirrors capable of splitting a multi-color fluorescence collected beam into at least four spatially separated color channels.

14. The device, according to claim 13, wherein the detection path comprises three dichroic mirrors that split the multi-color fluorescence collected beam into four spatially separated color channels.

15. The device, according to claim 14, wherein a detection area of the array detector is split into four equal parts, where four fluorescence image channels are imaged simultaneously through sets of re-directing mirrors and focusing lenses.

16. The device, according to claim 15, wherein an image is formed in the array detector of the fluorescence detection pathway containing 4 images of the biological sample, each of which corresponds to the fluorescence spectrum of the biological sample in a particular color-band.

17. The device, according to claim 13, wherein the device further comprises at least one additional set of three dichroic mirrors at the same positions and interchange automatically between the two sets of dichroic mirrors.

18. A method for assessing quality of a biological sample by measuring intrinsic autofluorescence of molecules present in said biological sample, using the device according to claim 1.

19. The method, according to claim 18, comprising:
a) obtaining raw multi or hyper spectral images from the fluorescence signal emitted by the biological sample using the device according to claim 1;
b) image processing of the spectral images obtained in said (a); and
c) classifying the processed images obtained in said (b).

20. The method, according to claim 18, wherein said biological sample is selected from the group consisting of a list comprising cells, biopsy tissues, organoids, oocytes, embryos, biological fluids such as blood, plasma, saliva, semen, urine, and any other biological sample provided that auto-fluorescent molecules are present in said biological sample.

21. The method, according to claim 18, wherein said biological sample is an embryo, preferably a human embryo.

22. The method, according to claim 18, wherein molecules present in the biological sample to be measured is selected from the group consisting of a list comprising nicotinamide adenine dinucleotide in a reduced state (NADH) both free and bound to a protein, flavin adenine dinucleotide (FAD), retinol, retinoic acid, folic acid, lipo-pigments such as lipofuscin and protoporphyrin IX (PPIX), elastin or proteins such as collagen.

23. The method, according to claim 18, wherein when a light-line is used in the delivery pathway, one dimension of the image formed in the array detector of the fluorescence detection pathway is a spatial information contained in a illuminated light-line from the sample (X-direction), and a second dimension encodes the spectrum of the fluorescence in a corresponding pixel from the light-line for each point of the biological sample.

24. The method, according to claim 23, wherein when the light-line is scanned across a sample volume, a hyperspectral data cube is built, which contains for each point of the biological sample, sample coordinates X, Y, Z, and a fluorescence spectrum.

25. The method, according to claim 18, wherein a detection path comprises at least three dichroic mirrors splitting multi-color fluorescence collected beam into at least four spatially separated color channels.

26. The method, according to claim 25, wherein the detection path comprises three dichroic mirrors that split the multi-color fluorescence collected beam into four spatially separated color channels.

27. The method, according to claim 26, wherein the array detector is divided in 4 equal areas where four fluorescence color images are imaged simultaneously through sets of redirecting mirrors and focusing lenses.

28. The method, according to claim 27, wherein an image is formed in the array detector of the fluorescence detection pathway containing 4 images of the biological sample, each of which corresponds to the fluorescence spectrum of the biological sample in a particular color-band.

29. The method, according to claim 28, wherein scanning a X-Y light-sheet across a volume of the biological sample yields a multispectral data cube containing X, Y, Z coordinates of each pixel and its fluorescence spectrum.

30. The method, according to claim 29, wherein said image processing of the spectral images comprises obtaining a spectral histogram, a phasor-plot and/or spectrally-unmixed data.

31. The method, according to claim 18, wherein the device uses machine learning algorithms for assessing quality and classifying of said biological sample.

* * * * *